United States Patent
Ohmura et al.

[11] Patent Number: 6,125,326
[45] Date of Patent: Sep. 26, 2000

[54] NAVIGATION SYSTEM

[75] Inventors: Hiroshi Ohmura, Hatsukaichi; Koji Hosoda, Hiroshima-ken; Hideaki Kikuchi, Hatsukaichi, all of Japan

[73] Assignee: Mazda Motor Corporation, Hiroshima-ken, Japan

[21] Appl. No.: 08/933,341

[22] Filed: Sep. 19, 1997

[30] Foreign Application Priority Data

Sep. 30, 1996 [JP] Japan .................................. 8-259140

[51] Int. Cl.⁷ .............................. G01S 3/02; H04B 7/29; G01C 21/00
[52] U.S. Cl. .......................... 701/213; 701/211; 701/207; 701/201; 701/202; 701/205; 701/206; 342/457; 455/456
[58] Field of Search .................................... 701/213, 211, 701/207, 201, 202, 205, 206; 342/457, 456

[56] References Cited

U.S. PATENT DOCUMENTS

| | | | |
|---|---|---|---|
| 5,666,272 | 9/1997 | Moore et al. | 361/735 |
| 5,710,600 | 1/1998 | Ishii et al. | 348/563 |
| 5,760,742 | 6/1998 | Branch et al. | 342/457 |
| 5,790,974 | 8/1998 | Tognazzini | 455/456 |
| 5,887,269 | 3/1999 | Brunts et al. | 701/208 |
| 5,889,943 | 3/1999 | Ji et al. | 340/825.34 |
| 5,899,956 | 5/1999 | Chan | 701/213 |

FOREIGN PATENT DOCUMENTS 4-238218  8/1992  Japan .
8-318792 12/1996 Japan .

*Primary Examiner*—William A. Cuchlinski, Jr.
*Assistant Examiner*—Olga Hernandez
*Attorney, Agent, or Firm*—Sixbey, Friedman, Leedom & Ferguson, P.C.; Donald R. Studebaker

[57] ABSTRACT

A combination of a main navigation apparatus 2 which is fixed to the vehicle and a sub-navigation apparatus 3 which is detachable from the vehicle. When the sub-navigation apparatus 3 is attached, map information and current position information is displayed on a main display 25 under control of a sub-control unit 1, and state of the vehicle is displayed on a sub-display 33. When detaching the sub-navigation apparatus 3 from the vehicle, area map information necessary for waking outside of the vehicle is transmitted from an on-vehicle database 22 to a RAM 32. When the sub-navigation apparatus is detached from the vehicle, if the operation switch 36 is turned on, either the sub-display 33 or a speaker 34 is operated by an sub-navigation unit in a saving power control mode in which either the sub-display 33 or the speaker 34 is operated only for a predetermined period of time since the operation switch 36 is turned on. When information stored in the RAM 32 is not insufficient, additional information is transmitted form the on-vehicle database 22 via a telephone terminal 37.

18 Claims, 5 Drawing Sheets

NAVIGATION SYSTEM

BACKGROUND OF THE INVENTION

The present invention relates to a navigation system and, more particularly, to a portable navigation apparatus comprising a main navigation apparatus which is fixed to a vehicle and a sub-navigation apparatus which is detachable from the vehicle.

Conventionally, portable navigation apparatuses configured to be detachable from a vehicle are known (refer to Japanese Patent Application Laid-Open No. 4-238218). In such a portable navigation apparatus, a display, a storage unit for storing variety of information, a navigation unit which calculates and obtains current position data and controls to display the current position of a vehicle together with map information provided from the storage unit on the display, a connection cable to connect an on-vehicle battery as a vehicle electric source, and a connector for the aforementioned cable are integrally configured in a container. The portable navigation apparatus can be used on a vehicle by connecting to the battery via the connection cable and the connector. Further, the portable navigation apparatus can be also used in another vehicle by disconnecting the connection cable from the battery of the vehicle to which it is connected currently, attaching the apparatus to the other vehicle, and connecting the connector to the battery of the other vehicle. Thus, the portable navigation apparatus is not fixed to a specific vehicle, and if it is not needed in a vehicle on which the navigation apparatus is currently attached, it can be moved and used in another vehicle, thereby, improving a utilization efficiency of the navigation apparatus.

SUMMARY OF THE INVENTION

In the aforesaid conventional portable navigation apparatus, however, the storage unit storing variety of necessary information for the navigation apparatus is required, which is an obstruction to downsize the apparatus. As a result, the size of the apparatus is considerably large as a "portable" apparatus. Especially, the storage unit used in the navigation apparatus is usually configured with a CD unit which includes a plurality of CD-ROMs on which a variety of information is recorded, and a reading unit of the CD-ROMs. Thus, the storage unit itself is quite large and occupies a considerable volume of the navigation apparatus.

Further, in the aforesaid conventional portable navigation apparatus, since only the connection cable used to connect to an on-vehicle battery and the connector are provided, although it can be detachable from a vehicle, it cannot be used unless being attached to a vehicle. Therefore, it is inconvenient since the navigation apparatus cannot be used when it is detached from the vehicle. In other words, the conventional portable navigation apparatus is essentially for using on a vehicle, therefore, it cannot be used in such manner that a user drives the vehicle to a destination, detaches the navigation apparatus from the vehicle to use it for obtaining map information and current position information while walking. It is possible to provide a battery for exclusive use by the conventional navigation apparatus, however, since the required capacity of the battery for the navigation apparatus is quite large, both the size and weight of the battery are also large, which causes increase in size and weight of the navigation apparatus. As described above, in order to obtain map information and current position information from the navigation apparatus when the user uses it outside of the vehicle, a battery for exclusive use by the navigation apparatus is necessary in addition to the navigation apparatus itself designed to be used on a vehicle.

The present invention has been made in consideration of the above situation, and has as its object to reduce the size of a navigation apparatus which is detachable from a vehicle, and increase availability and convenience by configuring the navigation apparatus for use independently when it is detached from the vehicle.

In order to overcome the aforesaid problems and attaining the foregoing object, a navigation system of the present invention comprises 1) a main navigation apparatus which is fixed to a vehicle and runs by a vehicle electric source and a sub-navigation apparatus which is detachable from the vehicle. The main navigation apparatus has: a main display; main storage means for storing various kinds of information including map information; and a main navigation unit for calculating current position data of the vehicle and outputting the calculated current position data to the main display together with the map information. The sub-navigation apparatus has: information output means for outputting information; sub-storage means to which information is written; an electric source for exclusive use by the sub-navigation apparatus; a sub-navigation unit for providing current position data via the information output means; and operation switches for operating the sub-navigation unit, and are integrally configured in the sub-navigation apparatus.

According to the configuration described in 1), the navigation system is configured with the combination of the main navigation apparatus which is fixed to a vehicle and the sub-navigation apparatus which is detachable from the vehicle. The main navigation apparatus implements normal navigation function which provides map information and current position information, for instance, upon connection to the vehicle electric source. As for the sub-navigation apparatus, information can be written to the sub-storage means and it is not necessary to store the various information in advance which is different from the main storage means. Therefore, the sub-storage means can be simply configured with, e.g., RAM without using CD-ROM, and the like. As a result, it is possible to configure the sub-storage means in much smaller size than the main storage means in the main navigation unit which is configured with, e.g., a CD unit, thereby, down-sizing the sub-navigation apparatus. Furthermore, since the electric source is provided in the sub-navigation apparatus, the sub-navigation apparatus is used by itself when it is detached from the vehicle.

2) Further, in the present invention, in addition to the configuration described in 1), the navigation system further comprises a control unit for collectively controlling the vehicle, wherein, when the sub-navigation apparatus is attached to the vehicle, the control unit is connected to the information output means, and the control unit provides vehicle state information on state of the vehicle via the information output means.

According to the configuration described in 2), when the sub-navigation apparatus is attached to the vehicle, its information output means is connected to the control unit in the vehicle for controlling various kinds of controls, such as vehicular control, and outputs vehicle state information, such as operation state of air conditioner and states of oil pressure and water temperature, for a user. Accordingly, it is possible to effectively use the sub-navigation apparatus when it is attached to the vehicle and the main navigation apparatus, thereby utilization efficiency of the sub-navigation apparatus improves.

3) Further, in the present invention, in addition to the configuration described in 1), a control unit for collectively controlling the vehicle is provided, and, when the sub-navigation apparatus is attached to the vehicle, the sub-storage means is connected to the control means, and the control unit controls to transmit area map information of a predetermined area whose substantial center is the current position of the vehicle on the basis of the current position data of the vehicle calculated by the main navigation unit from the main storage means to the sub-storage means in response to an instruction to detach the sub-navigation apparatus from the vehicle.

According to the configuration described in 3), when the sub-navigation apparatus is detached from the vehicle in order to use it outside of the vehicle, the area map information around the current position of the vehicle is transmitted from the main storage means of the main navigation apparatus to the sub-storage means of the sub-navigation apparatus on the basis of the current position data of the vehicle at the time detaching the sub-navigation apparatus. Accordingly, it is possible to obtain the map information of the current position of the user and its surrounding areas from the sub-navigation apparatus when the user is walking outside of the vehicle. Furthermore, since only necessary information is written to the sub-storage means of the sub-navigation apparatus each time detaching the sub-navigation apparatus from the vehicle, a memory of small capacity, such as RAM, is enough for the sub-storage means, thereby the sub-storage means is down-sized.

4) Further, in the present invention, in the configuration described in 1) or 3), the sub-navigation means further comprises a connection unit for connecting to telephone communication means, and the main navigation means further comprises a ground communication unit capable of performing reception and transmission from/to the sub-navigation apparatus via the telephone communication means. Further, the main navigation unit transmits information stored in the main storage means to the sub-storage means via the telephone communication means in response to a transmission instruction by one of the operation switches of the sub-navigation unit.

According to the configuration described in 4), when the sub-navigation apparatus is detached from the vehicle in order to use it while walking outside of the vehicle, it is possible to obtain navigation information, such as map information, from the main storage means on the vehicle via the telephone communication means when needed. Accordingly, it is unnecessary to store various kinds of information in the sub-storage means nor providing recording medium, such as CD-ROM, to the sub-navigation apparatus. Thus, a memory of small capacity, such as RAM, is enough for the sub-storage means, thereby the sub-storage means is down-sized. Especially, if the user carries the sub-navigation apparatus to whose sub-storage means the area map information around the vehicle position at the time detaching the sub-navigation apparatus is written, and walks beyond the area where the area map information covers, and when new map information is necessary, or if the user is in the area within the stored map information, but when the user needs more detailed information, information can be obtained from the main storage means on the vehicle via the telephone communication means, which increases availability and convenience.

5) Further, in the present invention, in the configuration described in 1), the sub-navigation apparatus and the main navigation apparatus respectively have GPS receivers for receiving signals from GPS satellites, and the GPS receiver of the sub-navigation apparatus and the GPS receiver of the main navigation apparatus are provided at separate positions from each other on the vehicle. And, when the sub-navigation apparatus is attached to the vehicle, the GPS receiver of the sub-navigation apparatus is connected to the main navigation unit, and the main navigation unit calculates the current position data of the vehicle on the basis of signals from the GPS satellites received by the GPS receivers of the main and sub-navigation apparatuses.

According to the configuration described in 5), when the sub-navigation apparatus is attached to the vehicle, calculation of the current-position data of the vehicle is performed in the main navigation apparatus on the basis of signals from the GPS satellites received by both of the GPS receivers of the main and sub-navigation apparatuses, more accurate current position data can be obtained comparing to a case where the current position data is calculated on the basis of GPS signals received by only one GSP receiver of the main navigation apparatus. Furthermore, since the GPS receivers are placed at separate positions from each other, such as at a front part of the vehicle and a rear part of the vehicle, more accurate current position data can be obtained.

6) Further, in the present invention, in the configuration described in 1), the information output means has both or either a sub-display whose screen size is smaller than that of the main display, and/or a sound output unit. Accordingly, the contents of information outputted by the information output means is determined specifically.

7) Further, in the present invention, in the configuration described in 1), the information output means has a sub-display whose screen size is smaller than that of the main display. And, when the sub-navigation apparatus is detached from the vehicle, the sub-navigation unit is run by the exclusive electric source and reduces displayed amount per unit area on the sub-display so as to be smaller than that on the main display.

According to the configuration described in 7), when the sub-navigation apparatus is detached from the vehicle, the sub-navigation unit controls to reduce displayed amount per unit area on the sub-display. Since the amount of data to be processed in the sub-navigation unit is small, energy consumption from the exclusive electric source is lowered. Accordingly, an electric source of small capacity is enough for the exclusive electric source, which down-sizes the exclusive electric source as well as the overall sub-navigation apparatus. In addition, although the screen size of the sub-display is smaller than that of the main display, since the displayed amount is reduced, it is not hard to view the displayed content on the sub-display.

8) Further, in the present invention, a portable navigation apparatus which is detachable from a vehicle comprises: an electric source for exclusive use by the portable navigation apparatus; information output means; storage means, capable of being rewritten, for storing map information; a navigation unit for controlling the information output means to provide at least current position information; and operation switches used for operating the navigation unit. The navigation unit is connected to a vehicle electric source when the portable navigation apparatus is attached to the vehicle and connected to the exclusive electric source when the portable navigation apparatus is detached from the vehicle, and the navigation unit starts controlling the information output means after the portable navigation apparatus is moved to an energy saving mode in which control load on the information output means is reduced.

According to the configuration described in 8), since the exclusive electric power source is provided, it is possible to obtain information, such as a current position, from the portable navigation apparatus when a user carries the portable navigation apparatus while walking outside of the vehicle by detaching it from the vehicle. In addition, when the portable navigation apparatus is detached from the vehicle, the navigation unit starts controlling the information output means after the portable navigation apparatus moves to an energy saving mode, thereby control load for outputting information from the information output means is reduced and the amount of data to be processed is also reduced. Accordingly, it is possible to configure the exclusive electric source with an electric source of small capacity. As a result, the portable navigation apparatus is down-sized, thus, convenience of the portable navigation apparatus when it is used outside of the vehicle increases.

9) Further, in the present invention, a portable navigation apparatus which is detachable from a vehicle comprises: an electric source for exclusive use by the portable navigation apparatus; information output means; storage means, capable of being rewritten, for storing map information; a navigation unit for controlling the information output means to provide at least current position information; and operation switches used for operating the navigation unit. The navigation unit is connected to a vehicle electric source when the portable navigation apparatus is attached to the vehicle and connected to the exclusive electric source which is isolated from the vehicle electric source when the portable navigation apparatus is detached from the vehicle, and the navigation unit starts controlling the information output means after the portable navigation apparatus is moved to an energy saving mode in which power consumption from the exclusive electric source is limited.

According to the configuration described in 9), since the exclusive electric power source is provided, similarly to the apparatus described in 8), it is possible to obtain information, such as a current position, from the portable navigation apparatus when a user carries the portable navigation apparatus while walking outside of the vehicle by detaching it from the vehicle. In addition, when the portable navigation apparatus is detached from the vehicle, the navigation unit starts controlling the information output means after the portable navigation apparatus moves to an energy saving mode, thereby the power consumption from the exclusive electric source is limited. Accordingly, it is possible to configure the exclusive electric source with an electric source of small capacity. As a result, similarly to the apparatus described in 8), the portable navigation apparatus is down-sized, thus, convenience of the portable navigation apparatus when it is used outside of the vehicle increases.

10) Further, in the present invention, in the configuration described in 8) or 9), the exclusive electric source has a solar battery.

According to the configuration described in 10), when the portable navigation apparatus is used outside of the vehicle, electric power is generated from solar rays, and the like, thus the size and weight of the exclusive electric source are reduced, thereby the size and weight of the overall apparatus are also reduced.

11) Further, in the present invention, in the configuration described in 8) or 9), the information output means includes both or either a display and/or a sound output unit. Accordingly, the contents of information outputted by the information output means is determined specifically.

12) Further, in the present invention, in the configuration described in 8) or 9), the information output means includes a display and a sound output unit, and the navigation unit turns on either the display or the sound output unit in response to an information output instruction from one of the operation switches when the portable navigation apparatus is detached from the vehicle, and information is provided from either the display or the sound output unit which is turned on.

According to the configuration described in 12), when the portable navigation apparatus is detached from the vehicle, information is outputted either from the display or the sound output unit in response to the information output instruction from one of the operation switches, and the navigation unit controls to stop providing electric power to the non-selected information output means. Accordingly, control load on the navigation unit is reduced, power consumption from the exclusive electric source is limited.

13) Further, in the present invention, the configuration described in 12) is more clearly specified, and when the portable navigation apparatus is disconnected from the vehicle, the navigation unit turns off the display and turns on the sound output unit in response to the information output instruction from one of the operation switches, and information is outputted as sound output from the sound output unit.

According to the configuration described in 13), when the portable navigation apparatus is detached from the vehicle, power supply to the display which requires larger amount of data to be processed by the navigation unit and consumes more electric power than the sound output unit is stopped, and information is outputted from the sound output unit. Thereby, the amount of data to be processed is reduced and the energy consumption is limited.

14) Further, in the present invention, in the configuration described in 8) or 9), when the portable navigation apparatus is detached from the vehicle, the navigation unit provides information via the information output means in response to reception of an information output instruction from one of the operational switches.

According to the configuration described in 14), when the portable navigation apparatus is detached from the vehicle, information is outputted by the information output means in response to reception of the information output instruction, and supply of electric energy to the information output means is stopped when the operation switch is not operated. Thus, the amount of data to be processed in the navigation unit is reduced and energy consumption is limited.

15) Further, in the present invention, the configuration described in 14) is more clearly specified, and the operation switches are momentary contact type switches, and the navigation unit controls to turn on the information output means during the operation switch is on.

According to the configuration described in 15), electric power is supplied to the information output means from the exclusive electric source during the operation switch is operated, and when the operation switch is released, power supply is automatically stopped. Thus, control load on the navigation unit is reduced and energy consumption from the exclusive electric source is automatically limited.

16) Further, in the present invention, in the configuration described in 8) or 9), the information output means has a display, and, when the portable navigation apparatus is detached from the vehicle, the navigation unit controls to display information on the display in response to reception of an operation instruction from one of the operation switches and stops displaying on the display after a predetermined period of time has lapsed.

According to the configuration-described in 16), when the portable navigation apparatus is detached from the vehicle, information is displayed on the display in response to reception of the operation instruction from the operation switch and the display stops displaying after a predetermined period of time has lapsed unless new operation instruction is received, and power supply to the display is stopped. Accordingly, energy consumption from the exclusive electric source is positively limited, in addition, since the navigation unit does not have to keep controlling the display, the amount of data to be processed by the navigation unit is reduced.

17) Further, in the present invention, in the configuration described in 1), the information output means has a display, and, when the portable navigation apparatus is detached from the vehicle, the navigation unit reduces displayed amount per unit area on the display than the displayed amount on the display when the portable navigation apparatus is attached to the vehicle.

According to the configuration described in 17), when the portable navigation apparatus is detached from the vehicle, the navigation unit controls to reduce displayed amount per unit area on said display, thereby the amount of data to be processed in the navigation unit is reduced and energy consumption from the exclusive electric source is limited. In addition, when the display is configured with a portable display of small screen size, since the displayed amount is reduced, it is not hard to view the displayed content on the display.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 1:
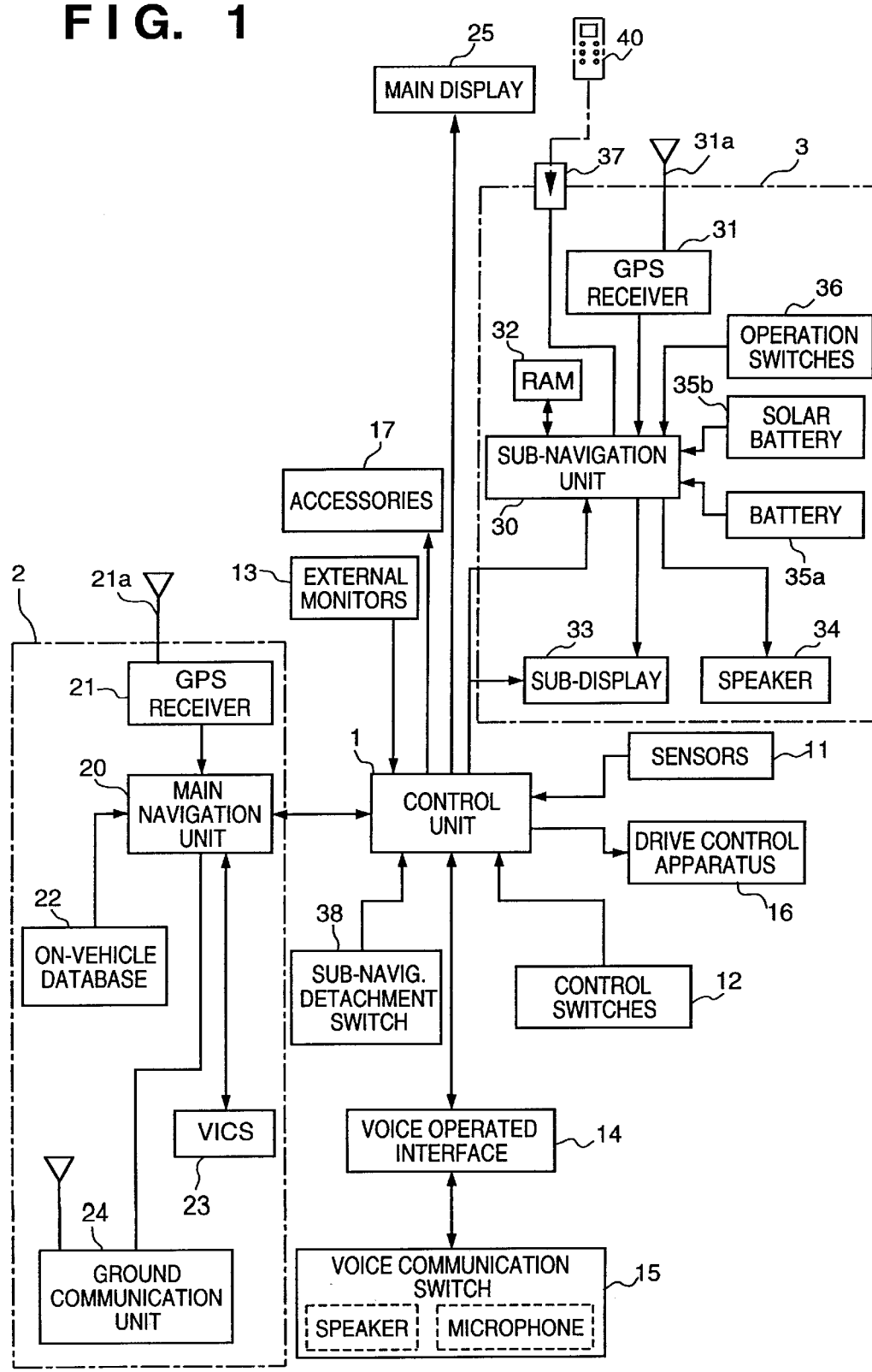
FIG. 1 is a block diagram illustrating a configuration of a control circuit of a navigation system according to an embodiment of the present invention.

In FIG. 1, reference numeral 1 denotes a control unit for collectively controlling a vehicle; 2, a main navigation apparatus which is fixed to the vehicle (abbreviated as "main navig.", hereinafter); and 3, a sub-navigation apparatus which is portable and detachable from the vehicle (abbreviated as "sub-navig.", hereinafter).

The control unit 1 includes a microcomputer, and collectively controls a drive control apparatus 16, various accessories 17, a main display 25, and a sub-display 33, for example, in response to detection signals from various sensors 11, operation instructions from various control switches 12, information from an external monitor 13, information from a main navigation unit 20 which will be explained later, and instructions from a voice communication switch 15 via a voice operated interface 14.

More specifically, the control unit 1 controls the drive control apparatus 16, such as an anti-skid brake system (ABS), a four wheel steering (4WS) system, a four 3, wheel drive (4WD) system, and an electric gasoline injection (EGI) system, in response to the detection signals from the various sensors 11, such as a speed sensor and an engine speed sensor, which detect a running state and a traveling state of the vehicle, as well as controls operation of the various accessories 17, such as a power window, a door lock, wipers, and air conditioner, in response to operation instructions from the various control switches 12. Further, the control unit 1 controls to display a vehicle interval distance, a proximity warning message, obstacle information, etc. on the sub-display 33 on the basis of information from the external monitors 13, such as an automatic tracking unit using a laser radar and rear and front monitor cameras, as well as controls to display road map information, current position information, route guidance information, and traffic information, etc. on the main display 25 on the basis of information from the main navigation unit 20 which will be explained later, further controls to display character information of traffic information by FM multiplex broadcast, radio wave beacon and light beacon on the sub-display 33. Upon performing the above controls, the control unit 1 notifies the driver of proximity warning and traffic jam information by voice outputted from a speaker of the voice communication switch 15 after converting the information to sound via the voice operated interface 14 and prompts a driver to perform corresponding operation.

The main navig. 2 includes the main navigation unit 20 which calculates the current position data and performs various controls of the main navig. 2, a global positioning system (GPS) receiver 21, an on-vehicle database 22, such as CD-ROMs and digital video disks (DVD), on which road map information, etc., is recorded, the main display 25, a vehicle information and control system unit (abbreviated to "VICS unit"), hereinafter) 23, and a ground communication unit 24, configured with an on-vehicle telephone, for example, for communicating via telephone communication means.

The GPS receiver 21 receives signals from a number of GPS satellites via a GPS antenna 21a, and inputs data for calculating latitude and longitude of a current position on the basis of the signals from the satellites to the main navigation unit 20. Further, the on-vehicle database 22 is basically configured with CD-ROMs and a reading unit. The CD-ROMs are recorded with road map information, and service information for showing buildings which can be landmarks on streets, gas stations, tourist attractions, business hours of stores, telephone numbers, etc. Further, the VICS unit 23 includes respective receivers for the FM multiplex broadcast and the radio wave beacon, and a light beacon sensor for performing bidirectional communication with the light beacon by using light signals. The VICS unit 23 receives traffic information (VICS information) from a traffic information center, which is an information base, via FM multiplex broadcast, radio wave beacon, or light beacon as information propagation medium, and inputs the received information to the main navigation unit 20. The ground communication unit 24 is able to receive emergency vehicle information of emergency vehicles, such as a police car, an ambulance and a fire truck, and emergency information, such as a traffic accident and a fire, propagated via radio wave of a specific frequency in a frequency range for ground radio-communication, in addition to telephone communication means.

The main navigation unit 20 calculates position coordinate data, such as latitude and longitude of the current position, on the basis of data from the GPS receiver 21 and data from the GPS receiver 31 of the sub-navig. 3, which will explained later, having the same configuration as the GPS receiver 21. Further, the main navigation unit 20 controls to display a road map image on the basis of rode map data, for example, read from the on-vehicle database 22 and service information, such traffic signals and gas stations, on the main display 25, and also controls to display a mark indicating the vehicle (own car mark) on the road map image on the basis of the position coordinate data. Further, the main navigation unit 20 controls to display the VICS information on the sub-display 33 as figures or characters via the control unit 1, and controls to output voice from the speaker of the voice communication switch 15 in accordance with the type of information. Furthermore, when emergency information is received, the main navigation unit 20 controls to warn by sound from the speaker of the communication switch 15 and to display an identifier or character information on the road map image on the display 25.

Note, the reason for controlling the above display (navigation display) on the main display 25 via the control unit 1 is that switching from various displayed contents, such as vehicle interval distance, to a navigation information image is performed by the control unit 1 in response to the operation of the control switch 12 by the driver, for instance.

The sub-navig. 3 includes a sub-navigation unit 30 having an electronic control unit, for calculating the current position data and performing various controls of the sub-navig. 3, the GPS receiver 31, a RAM 32 as a sub-storage means which information, explained later, can be written and read to/from, a sub-display 33 having a display screen smaller than that of the main display 25, a speaker 34 as a voice output unit including a sound circuit for converting information into sound, a dry battery 35a, such as a lithium dry battery, as a backup or as an emergency power source, a solar battery 35b as an exclusive power source used under normal condition, operation switches 36 including a monitor switch and a sound switch, for example, for giving operation instructions to the sub-navigation unit 30, and a telephone terminal 37, to be connected to the sub-navigation unit 30, for exchanging information with the main navig. 2 via telephone communication means. The above elements are packaged in a container (not shown). The sub-display 33 and the speaker 34 configure information output means for outputting information to a user as an image or sound.

Then, the sub-navig. 3 is temporally held, so as to be detachable, by being engaged to the vehicle via a holding mechanism (not shown) which is provided at a proper position near an instrument panel of the vehicle. With this holding mechanism, the sub-navig. 3 can be attached to the vehicle and detached from the vehicle. Switching from the attached state to the detached state is performed by releasing the holding mechanism in response to an operation of a sub-navig. detachment switch 38. Further, the sub-navig. detachment switch 38 is connected to the control unit 1, and a detachment signal is outputted to the control unit 1 in response to a switching operation. Further, in the sub-navig. 3, a connection unit (not shown) to the control unit 1 for transferring information to the RAM 32 via the sub-navigation unit 30 when the sub-navig. 3 changes from the attached state to the detached state, and a connecting unit (not shown) to the control unit 1 for controlling the displayed contents on the sub-display 33 by the control unit 1 are provided.

When the sub-navig. 3 is attached to the vehicle, the sub-navigation unit 30 and the sub-display 33 are connected to a vehicle electric source (vehicle battery) via the control unit 1 and each of the connecting units, whereas when the sub-navig. 3 is detached from the vehicle, connection via the connecting units are disconnected and electric sources 35a and 35b for exclusive use by sub-navig. 3 supply electric power to the sub-navigation unit 30 in response to switching operations by the operation switches 36.

The sub-navigation unit 30 outputs data based on GPS signals from the GPS satellites received by the GPS receiver 31 to the main navigation unit 20 via the control unit 1 when the sub-navig. 3 is attached to the vehicle, and, when detaching the sub-navig. 3, the sub-navigation unit 30 controls so that predetermined map information outputted via the main navigation unit 20 and the control unit 1 is written to the RAM 32. Whereas, when the sub-navig. 3 is detached from the vehicle, the sub-navigation unit 30 starts control operation in response to operations by the operation switches 36 as described above, calculates position coordinate data, such as latitude and longitude of the current position, on the basis of data based on the GPS signals received by the GPS receiver 31, controls to display road map, for example, based on the road map data written in the RAM 32 on the sub-display 33, and displays a mark indicating the current position on the road map on the basis of the current position coordinate data, or controls to output the information by voice from the speaker 34. In short, the sub-navig. 3 operates differently when it is attached to the vehicle and when it is detached from the vehicle. Display operation by the sub-display 33 and output operation from the speaker 34 are performed in response to switching operations by the operation switches 36 in sequences which will be explained later with reference to flowcharts.

Next, control by the control unit 1 when detaching the sub-navig. 3 which is currently connected on vehicle is explained with reference to FIG. 2.

Figure 2:
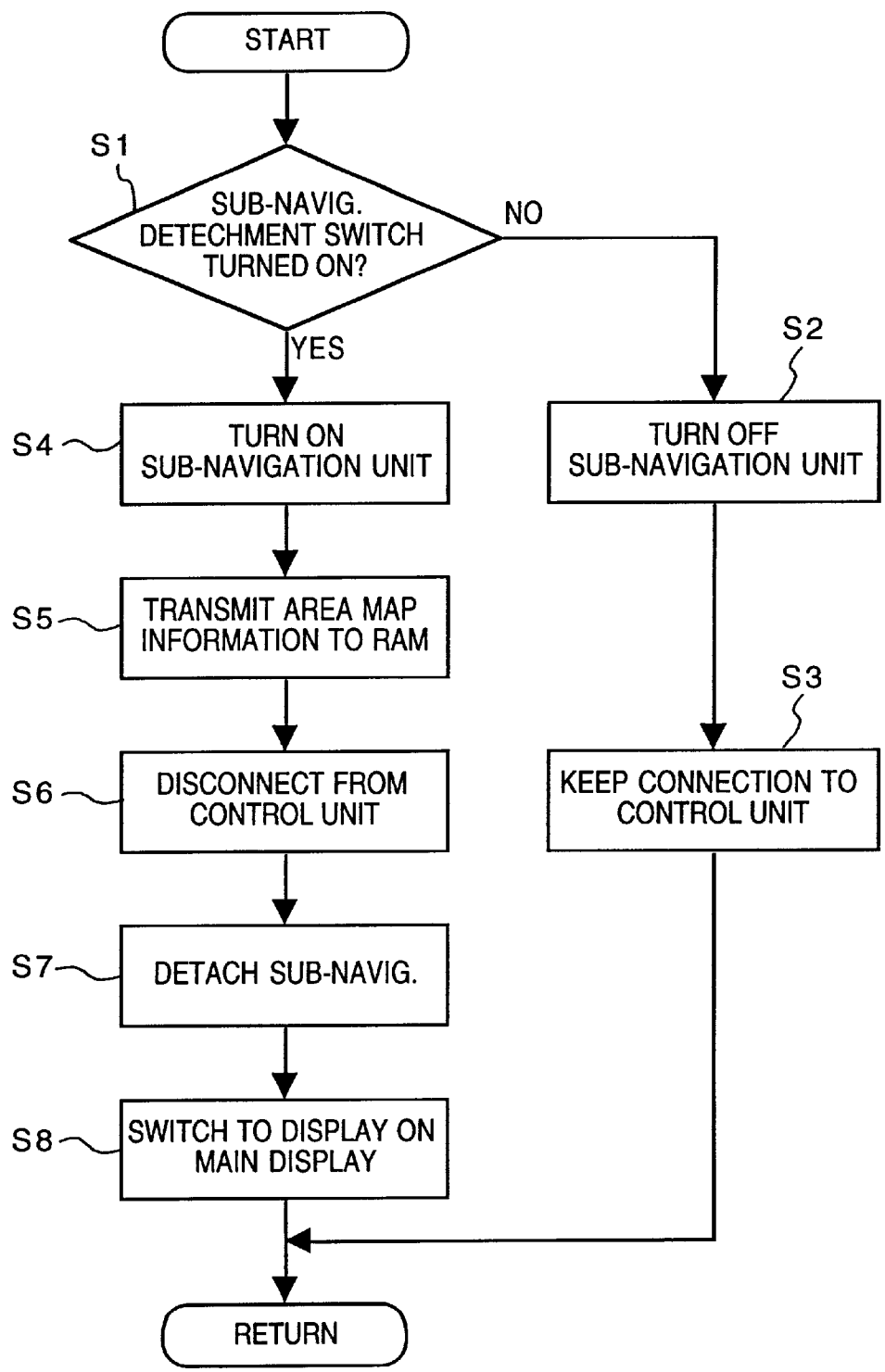
FIG. 2 is a flowchart of a control sequence when detaching a sub-navigation apparatus from a vehicle.

Referring to FIG. 2, first in step S1, whether or not the sub-navig. detachment switch 38 is turned on or not is determined, and if it is not ("NO" in step S1), then the sub-navigation unit 30 in the sub-navig. 3 is turned off in step S2. Then in step S3, connection to the control unit 1 is maintained so as to keep the sub-navig. 3 being under control of the control unit 1. If the sub-navig. detachment switched 38 is turned on ("YES" in step S1), then the processes in steps S4 to S8 are performed to switch the state of the sub-navig. 3 to the detached state. More specifically, the sub-navigation unit 30 of the sub-navig. 3 is turned on in step S4, and in step S5, on the basis of the current position data calculated by the main navigation unit 20, area map information in a predetermined area (e.g., area of 5 km radius) whose substantial center is the current position, for example, is transmitted from the main navig. 2 to the RAM 32 of the sub-navig. 3. After the transmission in step S5, connection to the control unit 1 is disconnected in step S6, and the sub-navig. 3 is detached from the holding member (step S7). Then, displayed contents, such as state of the vehicle, which were displayed on the sub-display 33 when the sub-navig. 3 is attached to the vehicle start being displayed on the main display 25. Accordingly, in a case where a user uses the sub-navig. 3 away from the vehicle by detaching it from the vehicle when the user is walking, information on an area where the user walks is written in the RAM 32, when detaching the sub-navig. 3. As a result, comparing to the large on-vehicle database 22, configured with the CD unit, in the main navig. 2, the size of the storage means in the sub-navig. 3 can be greatly reduced. Furthermore, the RAM 32 has enough information to use the sub-navig. 3 while walking.

Next, control of the sub-display 33 and the speaker 34 by the sub-navigation unit 30 in the detached sub-navig. 3 is explained below with reference to FIG. 3.

Figure 3:
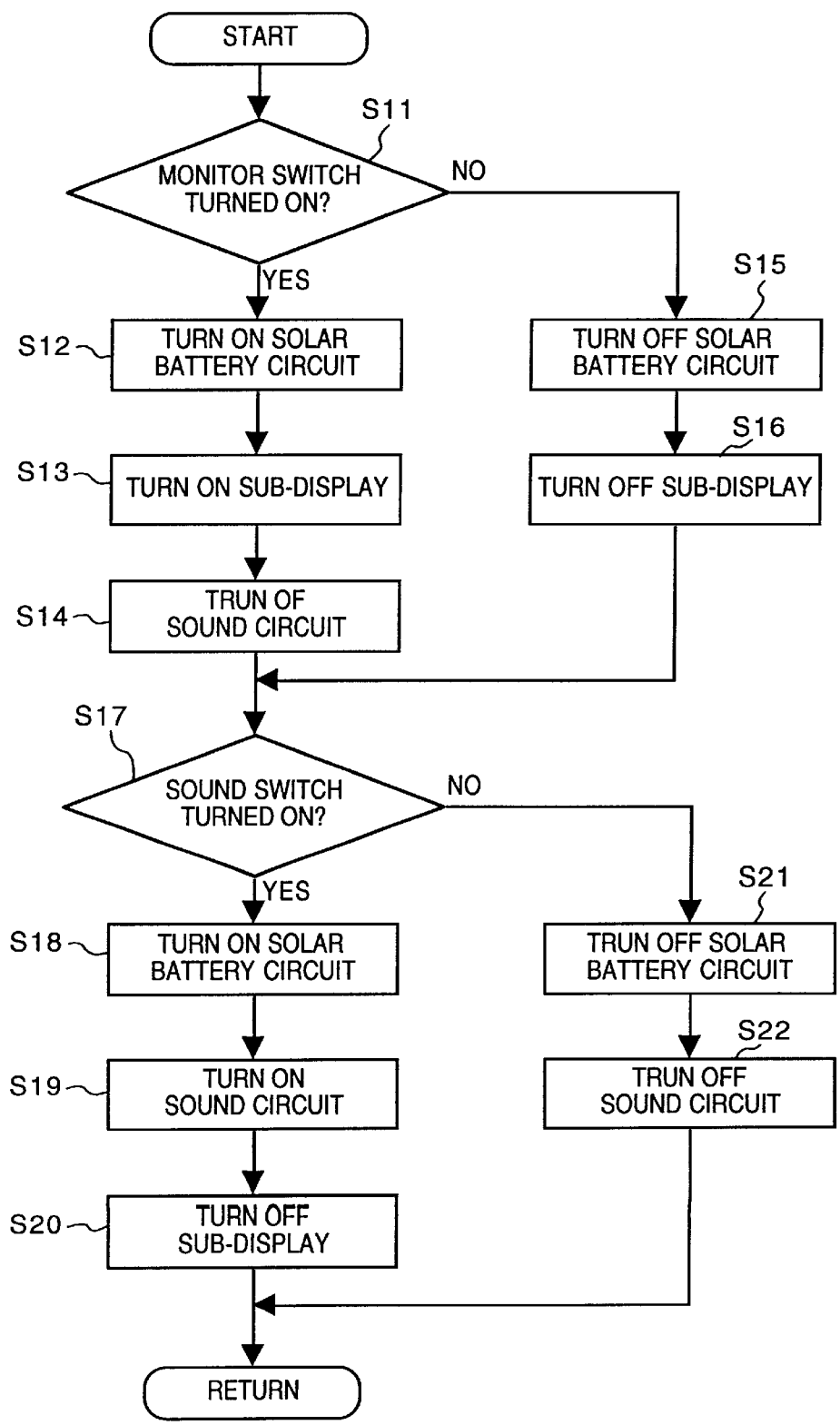
FIG. 3 is a flowchart of an operational control sequence of a display and a speaker of the sub-navigation apparatus when the sub-navigation apparatus is detached from the vehicle.

First in FIG. 3, whether the monitor switch which is one of the operation switches 36 is turned on or not is judged in step S11, and if it is ("YES" in step S11), a solar battery circuit is turned on to supply electric power from the solar battery 35b in step S12. In step S13, the sub-display 33 is turned on to display predetermined information, and a sound circuit (speaker 34) is turned off in step S14. Whereas, if the monitor switch is not turned on ("No" in step S11), then the solar battery circuit is turned off in step S15 so as to stop supplying electric power from the solar battery 35b, thereby turning off the sub-display 33 in step S16. Next in step S17, whether or not the sound switch which is one of the operation switches 36 is turned on or not is determined, and if it is ("YES" in step S17), then the solar battery circuit is turned on in step S18 to supply electric power from the solar battery 35b. In step S19, the sound circuit is turned on to output predetermined information as sound from the speaker 34, and the sub-display 33 is turned off in step S20. Whereas, if the sound switch is not turned on ("NO" in step S17), then the solar battery circuit is turned off in step S21 to stop supplying electric power from the solar battery 35b, and the sound circuit is also turned off in step S22. More specifically, either the sub-display 33 or the speaker 34 becomes on only when the monitor switch or the sound switch is operated. The switches may be configured with momentary contact switches which are automatically turned off when the switches are released. Further, either the sub-display 33 or the speaker 34 is used to output information only when either the monitor switch or the sound switch is turned-on. Accordingly, by limiting the energy consumption from the exclusive power source in the sub-navig. 3, it is possible to reduce the consumption of electric power to a minimum level. As a result, it is possible to greatly reduce the size of the exclusive power source attached to the sub-navig. 3 by using the solar battery 35b as the exclusive power source. Furthermore, the sub-display 33 is designed so that, when displaying on the sub-display 33, the amount of information displayed in a unit area of the screen is smaller than that of the main display 25. More specifically, on the sub-display 33, service information, such as traffic signals, gas stations and convenience stores, which are displayed on the main display 25 are not displayed in order to reduce the processing load required for driving the sub-display 33, thereby constraining the electric energy consumption.

Note, if the aforesaid various operation switches are on-off type, instead of momentary contact type, after a predetermined time period (e.g., 60 sec.) lapses since the sub-display 33 is turned on in step S13, the sub-display 33 may be forced to be turned off. By controlling as above, it is possible to limit the electric power consumption by not having prolong displayed information on the sub-display 33.

In order to prepare for a case where the information written in the RAM becomes insufficient when a user uses the detached sub-navig. 3 while walking, e.g., a case where the user goes beyond an area of the area map information transmitted to the RAM 32 when detaching the sub-navig. 3 and new information outside of the area as originally stored in the RAM 32 becomes necessary, the navigation system of the present invention may be configured so as to be operated as follow. First, a cellular phone, for example, is connected to the telephone terminal 37, thereby connecting the sub-navig. 3 to the ground communication unit 24 in the main navig. 2 via telephone communication means. After the communication is established, new area map information around the current position and outside of the originally stored area is transmitted from the on-vehicle database 22 to the RAM 32 of the sub-navig. 3.

Figure 4:
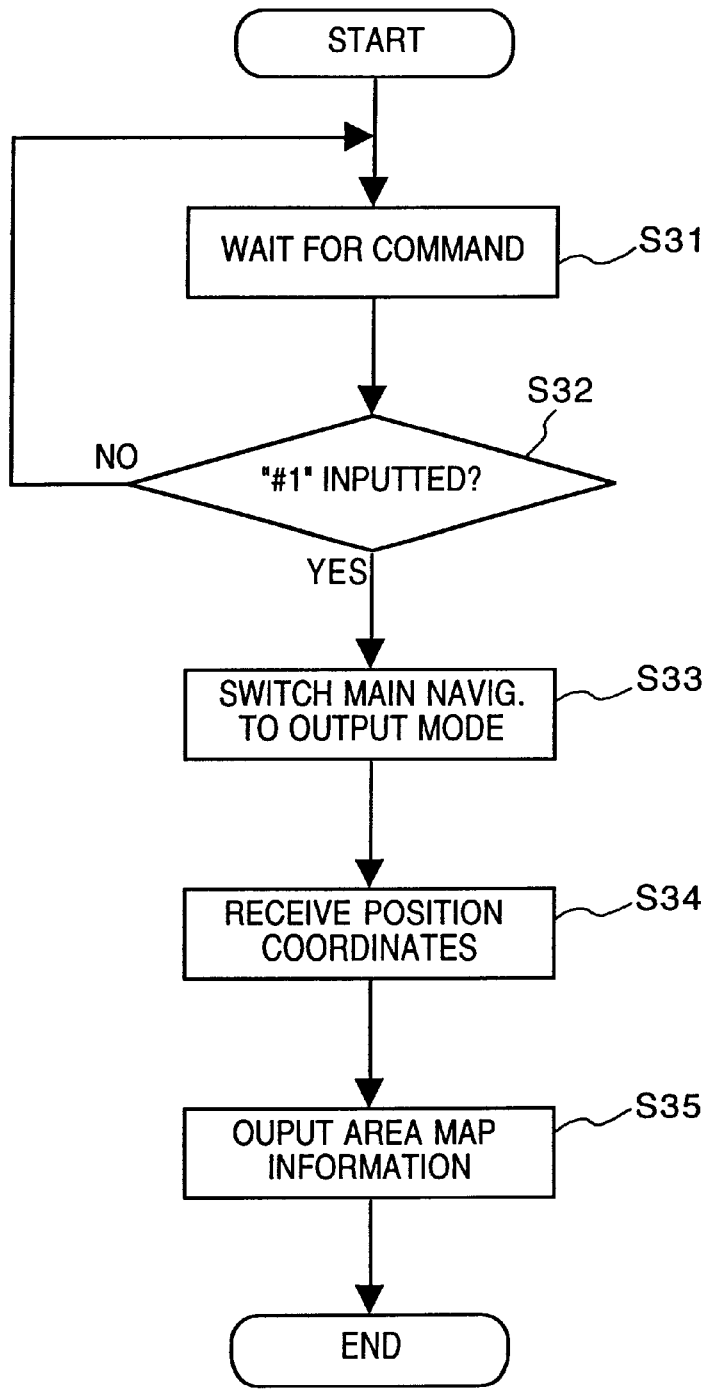
FIG. 4 is a flowchart of a control sequence when transmitting information from the vehicle to the sub-navigation apparatus when the sub-navigation apparatus is detached from the vehicle.

Next, referring to FIG. 4, control by the control unit 1 on the vehicle, when the sub-navig. 3 needs more information, is explained.

In FIG. 4, after communication between the sub-navig. 3 and the main navig. 2 is established via telephone communication means, the process waits until a command "#1" is inputted from one of the operation switches 36 of the sub-navig. 3 in steps S31 and S32. When "#1" is inputted in step S32 ("YES" in step 32), then the control unit 1 controls the main-navig. 2 to switch to an output mode in step S33, and receives position coordinates of the current position of the sub-navig. 3 from the sub-navig. 3 in step S34. Then in step S35, area map information whose substantial center is the current position coordinates obtained in step S34 is transmitted toward the RAM 32 of the sub-navig. 3.

As described above, if the information originally transmitted to the RAM 32 when detaching the sub-navig. 3 from the vehicle becomes insufficient, further information can be obtained from the on-vehicle database 22.

Figure 5:
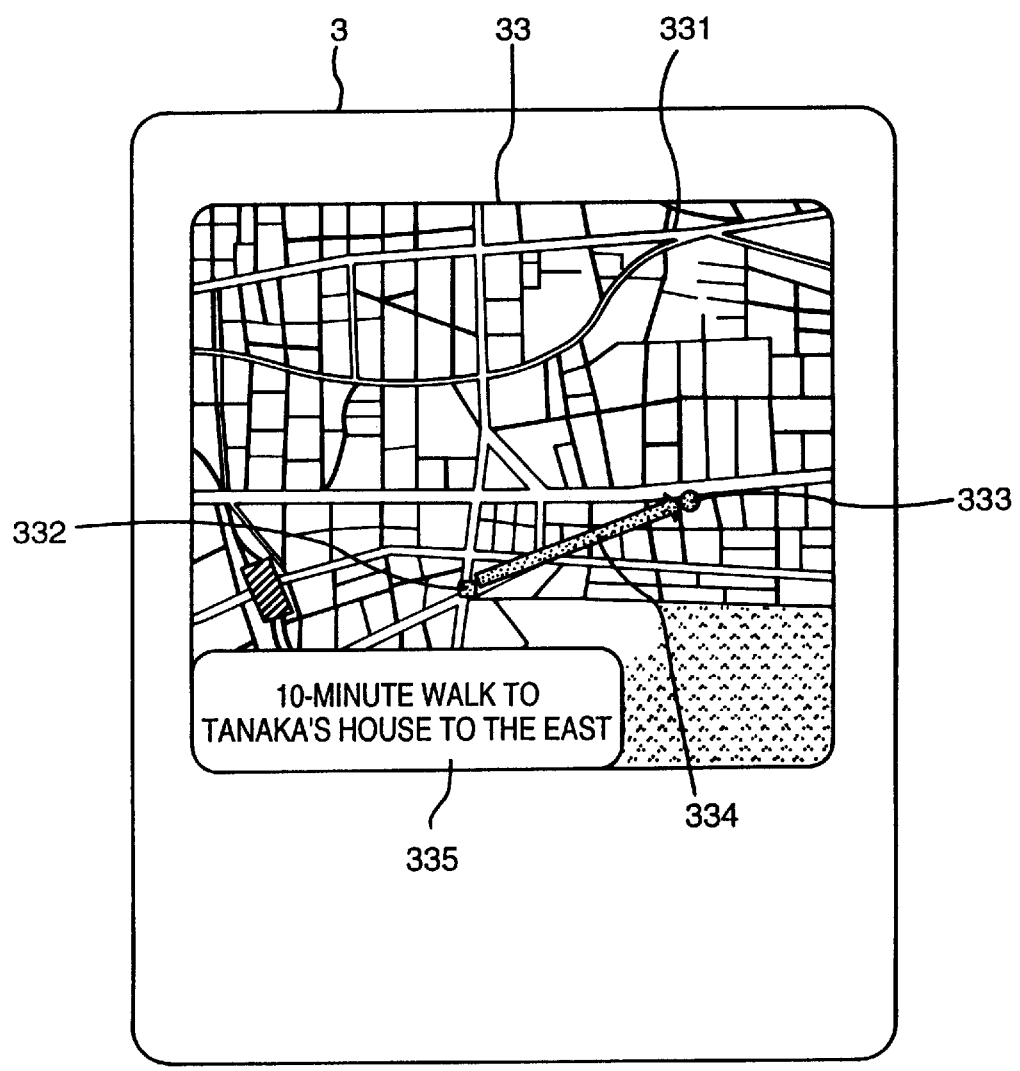
FIG. 5 is a view showing an example of a displayed content of the display of the sub-navigation apparatus when the sub-navigation apparatus is detached from the vehicle.

Further, by communicating with the on-vehicle database 22 via the telephone communication means, the sub-navig. 3 can obtain more detained information than the information originally transmitted when being detached from the vehicle, from the on-vehicle database 22. For example, assume that the location of a house of a friend or an acquaintance is not known and a user wants to display the location of the house on the map image displayed on the sub-display 33. In such case, a cellular phone 40, for example, is connected to the telephone terminal 37, further to the main-navig. 2 on the vehicle via the telephone communication means in the same manner as described above. Thereafter, the user inputs telephone number of the friend or acquaintance, in turn, address information corresponding to the telephone number is transmitted from the on-vehicle database 22 and written to the RAM 32 of the sub-navig. 3. Then the location of the house is displayed on the map image on the sub-display 33 on the basis of the address information. An example of displayed content on the sub-display 33 in such case is shown in FIG. 5. In the displayed image, a current position mark 332 indicating the current position of the user who is walking, a destination mark 333 showing the location of the house of the friend or the acquaintance where the user is to visit, and an arrow 334 showing the direction to the destination from the current position of the user are shown in the map image 331 displayed on the sub-display 33. In addition, the distance from the current position of the user to the destination is calculated, a approximately required time to arrive at the destination is calculated on the basis of the calculated distance and a normal walking speed, and character information 335 indicating the above information are displayed together with the map image.

<Other Embodiments>

The present invention is not limited to the above embodiment, and includes various changes and modifications made within the spirit and scope of the present invention. For example, the information output means is configured with the sub-display 33 and the speaker 34 in the sub-navig. 3 in the above embodiment, however, the present invention is not limited to this, and the information output means may be configured with either the sub-display 33 or the speaker 34.

Furthermore, in the above embodiment, the solar battery 35b is used for the exclusive power source for the sub-navig. 3, however, the dry battery 35a, such as a lithium dry battery, alone may be used as the exclusive electric source without providing the solar battery.

Further, in the aforesaid embodiment, when the sub-navig. 3 is attached to the main-navig. 2, calculation of current position data by the main navig. 2 is performed on the basis of the GPS signals received by the GPS receivers 21 and 31. However, the GPS receiver 31 in the sub-navig. 3 may be controlled so as not to be used, and the calculation may be performed only on the basis of the GPS signals received by the GPS receiver 21 of the main navig. 2. Further, the current position data may be calculated on the basis of the GPS signals in consideration of a self-contained navigation method based on detected values by a vibration-type gyro and the speed sensor.

According to the present invention as described above,

1) The navigation system is configured with the combination of the main navigation apparatus which is fixed to a vehicle and the sub-navigation apparatus which is detachable from the vehicle, thereby the sub-navigation apparatus can be down-sized. Further, when the sub-navigation apparatus is detached from the vehicle, it is used by itself while a user is walking. Accordingly, the user needs not purchase any portable apparatus having a navigation function for walking.

2) Further, according to the present invention, in addition to the effect described in 1), when the sub-navigation apparatus is attached to the vehicle, it can be used for a different use from the main navigation apparatus. Accordingly, it is possible to effectively use the sub-navigation apparatus when it is attached to the vehicle and the main navigation apparatus, thereby utilization efficiency of the sub-navigation apparatus improves.

3) Further, according to the present invention, in addition to the effect described in 1), when the sub-navigation apparatus is detached from the vehicle in order to use it outside of the vehicle while walking, it is possible to obtain map information of the current position of the user and its surrounding areas from the sub-navigation apparatus. Furthermore, the sub-storage means of the sub-navigation apparatus is down-sized.

4) Further, according to the present invention, in addition to the effect described in 1) or 3), when the sub-navigation apparatus is detached from the vehicle in order to use it while walking outside of the vehicle, additional information and detailed information can be obtained from the main navigation apparatus on the vehicle when necessary, which increases availability and convenience. In addition, the sub-storage means of the sub-navigation apparatus is down-sized.

5) Further, according to the present invention, in addition to the effect described in 1), when the sub-navigation apparatus is attached to the vehicle, more accurate current position data (from the main navigation apparatus) can be obtained comparing to a case where the current position data is calculated on the basis of GPS signals received by only one GSP receiver of the main navigation apparatus.

6) Further, according to the present invention, the contents of information outputted by the information output means described in 1) is determined specifically.

7) Further, according to the present invention, in addition to the effect described in 1), when the sub-navigation apparatus is detached from the vehicle, the amount of data to be processed in the sub-navigation unit for controlling the sub-display is small, thereby, energy consumption from the exclusive electric source is lowered. Accordingly, an electric source of small capacity is enough for the exclusive electric source, which down-sizes the exclusive electric source as well as the overall sub-navigation apparatus. In addition, although the screen size of the sub-display is smaller than that of the main display, it is not hard to view the displayed content on the sub-display.

8) Further, according to the present invention, when the portable navigation apparatus is detached from the vehicle for walking, it can be used as a navigation apparatus from which information, such as position information, is obtained. In addition, the portable navigation apparatus is down-sized, thus, convenience of the portable navigation apparatus when it is used outside of the vehicle for walking increases.

9) Further, according to the present invention, similarly to the effect described in 8), when the portable navigation apparatus is detached from the vehicle for walking, it can be used as a navigation apparatus from which information, such as position information, is obtained. In addition, the portable navigation apparatus is down-sized, thus, convenience of the portable navigation apparatus when it is used outside of the vehicle for walking increases.

10) Further, according to the present invention, in addition to the effect described in 8) or 9), when the portable navigation apparatus is used outside of the vehicle, electric power is generated, thus the size and weight of the exclusive electric source are reduced, thereby the size and weight of the overall potable navigation apparatus are also reduced.

11) Further, according to the present invention, the contents of information outputted by the information output means described in 8) or 9) is determined specifically.

12) Further, according to the present invention, in addition to the effect described in 8) or 9), control load on the navigation unit is specifically reduced. Therefore, and power consumption from the exclusive electric source is limited because of the reduced amount of data to be processed by the navigation unit.

13) Further, according to the present invention, control load on the navigation unit and the power consumption from the exclusive electric source described in 12) is reduced.

14) Further, according to the present invention, in addition to the effect described in 8) or 9), control load on the navigation unit is reduced and the power consumption from the exclusive electric source is limited.

15) Further, according to the present invention, control load on the navigation unit is reduced and the power consumption from the exclusive electric source described in 14) is limited, automatically.

16) Further, according to the present invention, in addition to the effect described in 8) or 9), energy consumption from the exclusive electric source is positively limited, in addition, since the navigation unit does not have to keep controlling the display, the amount of data to be processed by the navigation unit is reduced.

17) Further, according to the present invention, in addition to configuration described in 8) or 9), control load on the navigation unit is reduced and energy consumption from the exclusive electric source is limited. In addition, when the display is configured with a portable display of small screen size, it is not hard to view the displayed content on the display.

What is claimed is:

1. A navigation system comprising:
   a main navigation apparatus, which is fixed to a vehicle and run by a vehicle electric source, including:
   a main display;
   main storage means for storing various kinds of information including map information; and
   a main navigation unit for calculating current position data of the vehicle and outputting the calculated current position data to said main display together with the map information; and
   a sub-navigation apparatus, which is detachable from the vehicle, including:
   information output means for outputting information;
   sub-storage means to which information is written;
   an electric source for exclusive use by said sub-navigation apparatus; and
   a sub-navigation unit for providing current position data via said information output means,
   wherein operation switches used for operating said sub-navigation unit are integrally provided to said sub-navigation apparatus.

2. The navigation system according to claim 1 further comprising a control unit for collectively controlling the vehicle,
   wherein, when said sub-navigation apparatus is attached to the vehicle, said control unit is connected to said information output means, and said control unit provides vehicle state information on state of the vehicle via said information output means.

3. The navigation system according to claim 1, further comprising a control unit for collectively controlling the vehicle,
   wherein, when said sub-navigation apparatus is attached to the vehicle, said sub-storage means is connected to said control means, and said control unit controls to transmit area map information of a predetermined area whose substantial center is the current position of the vehicle on the basis of the current position data of the vehicle calculated by said main navigation unit from said main storage means to said sub-storage means in response to an instruction to detach said sub-navigation apparatus from the vehicle.

4. The navigation system according to claim 3, connection unit for connecting to telephone communication means, and said main navigation means further comprises a ground communication unit capable of performing reception and transmission from/to said sub-navigation apparatus via the telephone communication means,
   and wherein said main navigation unit transmits information stored in said main storage means to said sub-storage means via the telephone communication means in response to a transmission instruction by one of said operation switches of said sub-navigation unit.

5. The navigation system according to claim 1, wherein said sub-navigation means further comprises a connection unit for connecting to telephone communication means, and said main navigation means further comprises a ground communication unit capable of performing reception and transmission from/to said sub-navigation apparatus via the telephone communication means,
   and wherein said main navigation unit transmits information stored in said main storage means to said sub-storage means via the telephone communication means in response to a transmission instruction by one of said operation switches of said sub-navigation unit.

6. The navigation system according to claim 1, wherein said sub-navigation apparatus and said main navigation apparatus respectively have GPS receivers for receiving signals from GPS satellites, and the GPS receiver of said sub-navigation apparatus and the GPS receiver of said main navigation apparatus are provided at separate positions from each other on the vehicle, and, when said sub-navigation apparatus is attached to the vehicle, the GPS receiver of said sub-navigation apparatus is connected to said main navigation unit, and said main navigation unit calculates the current position data of the vehicle on the basis of signals from the GPS satellites received by the GPS receivers of said main and sub-navigation apparatuses.

7. The navigation system according to claim 1, wherein said information output means has a sub-display whose screen size is smaller than that of said main display, and/or a sound output unit.

8. The navigation system according to claim 1, wherein said information output means has a sub-display whose screen size is smaller than that of said main display, and, when said sub-navigation apparatus is detached from the vehicle, said sub-navigation unit is run by said exclusive electric source and reduces displayed amount per unit area on the sub-display so as to be smaller than that on said main display.

9. A portable navigation apparatus which is detachable from a vehicle comprising:
   an electric source for exclusive use by the portable navigation apparatus;
   information output means;
   storage means, capable of being rewritten, for storing map information;
   a navigation unit for controlling said information output means to provide at least current position information; and
   operation switches used for operating said navigation unit,
   wherein said navigation unit is connected to a vehicle electric source when said portable navigation apparatus is attached to the vehicle and connected to said exclusive electric source when said portable navigation apparatus is detached from the vehicle, and said navigation unit starts controlling said information output means after the portable navigation apparatus is moved to an energy saving mode in which control load on said information output means is reduced.

10. The portable navigation apparatus according to claim 9, wherein said information output means includes a display and a sound output unit, and said navigation unit turns on either said display or said sound output unit in response to an information output instruction from one of said operation switches when said portable navigation apparatus is detached from the vehicle, and information is provided from either said display or said sound output unit which is turned on.

11. The portable navigation apparatus according to claim 10, wherein, when said portable navigation apparatus is disconnected from the vehicle, said navigation unit turns off said display and turns on said sound output unit in response to the information output instruction from one of said operation switches, and information is outputted as sound output from said sound output unit.

12. The portable navigation apparatus according to claim 9, wherein, when said portable navigation apparatus is detached from the vehicle, said navigation unit provides information via said information output means in response to reception of an information output instruction from one of said operational switches.

13. The portable navigation apparatus according to claim 12, wherein said operation switches are momentary contact type switches, and said navigation unit controls to turn on said information output means during the operation switch is on.

14. The portable navigation apparatus according to claim 9, wherein said information output means has a display, and, when the portable navigation apparatus is detached from the vehicle, said navigation unit controls to display information on said display in response to reception of an operation instruction from one of said operation switches and stops displaying on said display after a predetermined period of time has lapsed.

15. The portable navigation apparatus according to claim 9, wherein said information output means has a display, and, when the portable navigation apparatus is detached from the vehicle, said navigation unit reduces displayed amount per unit area on said display than the displayed amount on said display when the portable navigation apparatus is attached to the vehicle.

16. A portable navigation apparatus which is detachable from a vehicle comprising:

an electric source for exclusive use by the portable navigation apparatus;

information output means;

storage means, capable of being rewritten, for storing map information;

a navigation unit for controlling said information output means to provide at least current position information; and operation switches used for operating said navigation unit, wherein said navigation unit is connected to a vehicle electric source when said portable navigation apparatus is attached to the vehicle and connected to said exclusive electric source which is isolated from the vehicle electric source when said portable navigation apparatus is detached from the vehicle, and said navigation unit starts controlling said information output means after the portable navigation apparatus is moved to an energy saving mode in which power consumption from said exclusive electric source is limited.

17. The portable navigation apparatus according to claim 16, wherein said exclusive electric source has a solar battery.

18. The portable navigation apparatus according to claim 16, wherein said information output means includes a display and/or a sound output unit.

* * * * *